United States Patent [19]

Castagna

[11] Patent Number: 5,503,114
[45] Date of Patent: Apr. 2, 1996

[54] COLLAR AND MESSAGE LABEL HOLDER

[75] Inventor: Robert D. Castagna, 4 Birch Ct., Blackwood, N.J. 08012

[73] Assignee: Robert D. Castagna, Blackwood, N.J.

[21] Appl. No.: 110,739

[22] Filed: Aug. 23, 1993

[51] Int. Cl.⁶ .................................................. A01K 27/00
[52] U.S. Cl. ................................... 119/858; 40/665
[58] Field of Search ....................... 119/856, 858; 40/665, 300, 303, 640

[56] References Cited

U.S. PATENT DOCUMENTS

| | | | |
|---|---|---|---|
| 164,165 | 6/1875 | Goldsmith | 40/665 |
| 231,277 | 8/1880 | Cohen | 40/665 |
| 1,328,019 | 1/1920 | Stewart | 40/665 |
| 1,539,744 | 5/1925 | Kelly | 119/858 X |
| 2,087,921 | 7/1937 | Mayer | 40/665 |
| 2,097,070 | 10/1937 | Lago | 119/858 |
| 2,680,315 | 6/1954 | McHugh et al. | 119/858 X |
| 3,231,992 | 2/1966 | Sweet | 40/665 |
| 3,879,870 | 4/1975 | Bachand | 40/665 |
| 4,142,310 | 3/1979 | Groselak et al. | 40/665 |
| 4,178,879 | 12/1979 | Cunningham | 119/858 |
| 4,464,854 | 8/1984 | Hall | 119/858 X |
| 5,054,433 | 10/1991 | Pfleger | 119/856 |

*Primary Examiner*—Thomas Price

[57] ABSTRACT

A device and method for providing a message directly from the pet, about a specific and/or special need of the pet, to any individual coming in contact with the pet, i.e. dog, cat or small mammal, by attaching to the pet's collar, a specially designed message holder which will accomodate hand written or printed label messages is discussed. Also discussed, is a series of essential label messages which form an integral part of this device.

8 Claims, 1 Drawing Sheet

U.S. Patent Apr. 2, 1996 5,503,114
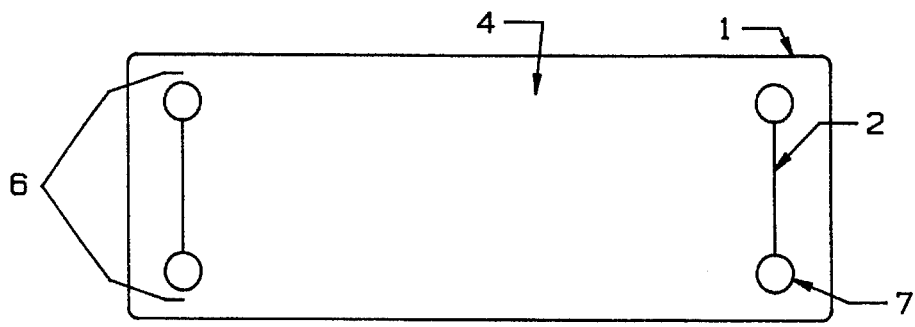
FIGURE 1
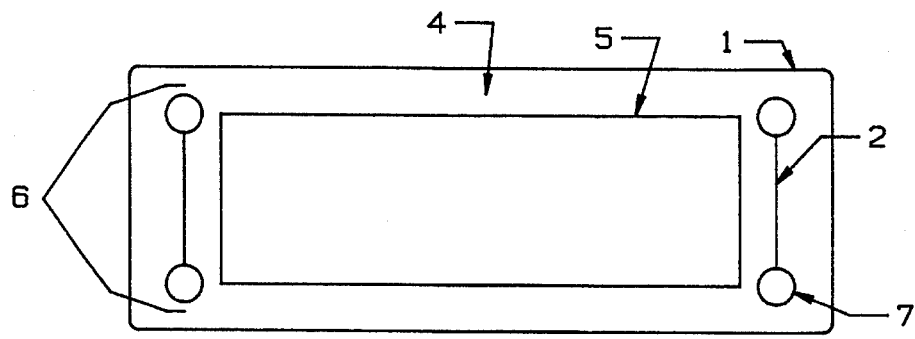
FIGURE 2
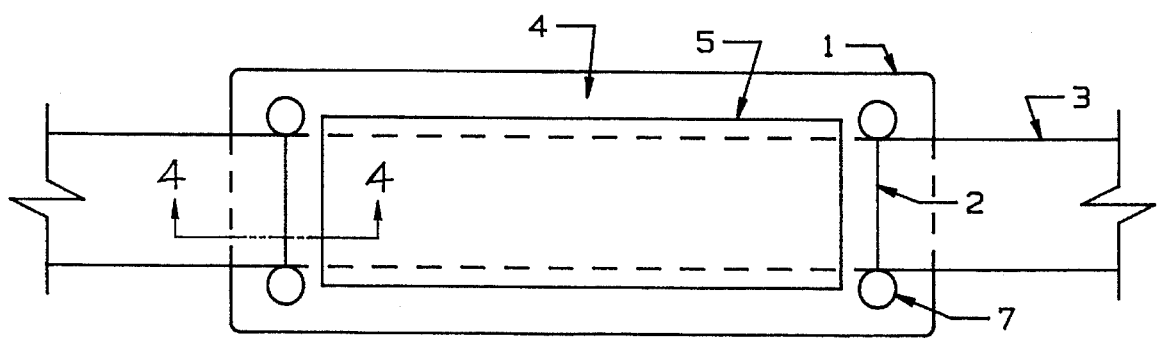
FIGURE 3
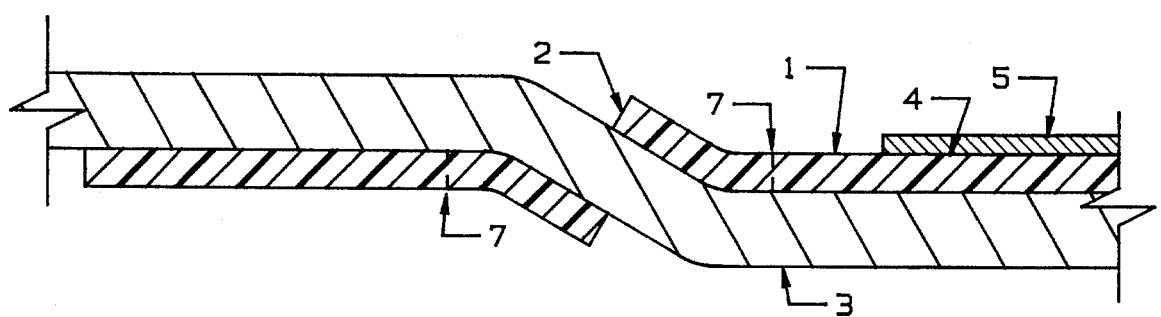
FIGURE 4 – ENLARGED SECTION 4 – 4

COLLAR AND MESSAGE LABEL HOLDER

BACKGROUND OF INVENTION

1. Field of Invention

This invention relates to a mechanical device and a method for alerting individuals to specific and/or special needs of the pet.

2. Description of Prior Art

The generally accepted conventional method of informing any individual of any certain specific and/or special needs of the pet has been by written documentation and/or verbal communications all from individual to individual. Signs sometimes have been placed on the pet's cage when the pet owner is not present. Unless an individual has had prior instructions or has been given written documentation regarding the pet's specific and/or special needs, that individual has no way of properly fulfilling the needs of the pet.

SUMMARY OF THE INVENTION

It is the object of the present invention to provide a direct pet communicating device to permit individuals coming in contact with the pet to instantly and continuously be aware of the pet's specific and/or special needs even in the absent of the owner or the pet's care taker. These objects, and others which will become apparent from the following discussions, are achieved by the invention which comprises a device for attaching to a pet's collar which will then allow a statement or message to be written on it or attached to it in a manner so as to immediately inform any individual having contact with the pet of the specific and/or special needs of the pet. This label holding device can also be utilized to easily accommodate "reflector tape". Reflector tape is a commercially available product that glows in the dark when a light is aimed at it. When it is used on the label holding device on the pet's collar, it will help locate the pet in a darken environment.

BRIEF DESCRIPTION OF THE DRAWING

FIG. 1 is a front view of the device which shows the cut-outs for attaching the device to the pet's collar.

FIG. 2 is a front view of the device and shows a blank label in the proper position on the device.

FIG. 3 is a front view of the device with a blank label in its proper position on the device which is attached to the pet's collar.

FIG. 4 is an enlarged cross sectional view of the cut-out section of the device and shows the inter-action of the device with the pet's collar.

DETAILED DESCRIPTION OF THE INVENTION AND PREFERRED EMBODIMENTS

In a preferred mode, the invention is a pet collar message holding device comprising a label holder made of flexible material which is sized to accomodate a collar of a pet.

In FIGS. 1 through 4 there is a label holding device 1 with special cut-outs 6, comprising a slit 2 oriented perpendicularly to the long axis of the device 1 and a circle cut-out 7 at each end of the slit 2, to allow a pet collar 3 to be fitted through them and the device contains a space 4 to allow a printed label 5 or hand written message to be placed there. The cut-outs are comprised of two linear cut-outs, one at each end of the label holder, with slits running perpendicular to the long axis of the label holder. The slit portion of each cut-out terminates at each end of each slit, in a circular cut-out portions contiguous with the slit. See FIGS. 1–3. The special cut-outs are designed and sized to allow large snap type buckles to be passed through them and designed to prevent the label holding device from slipping around the cellar. This anti-slipping feature is accomplished by providing only a slit size opening at each end of the label holding device. This slit size opening is to accomodate a comparably very large pet collar strap. The resilient tendency of the slit size opening is to close up, thus providing the pressure on the collar which prevents the label holding device from slipping around the collar. The circular cut-out portions function to allow the slits to open wide so as to be able to accommodate large snap type buckle collars, (see FIG. 4, A—A).

The device is fabricated from a thin sheet of polystyrene plastic or similar material and is waterproof, flexible, writable and is sized to each individual size of the pet collar.

An integral of this device is a set of printed waterproof labels containing specific messages which form a part of this invention and are contained in list A. These labels are in proportion to the size of the label holding device which is in proportion to the size of the pet's collar. These labels are designed to be selectively utilized as needed with the label holding device.

---

LIST "A"

Label 1.

Please do not feed me
Doctors orders
I am on a specially prepared diet.

Label 2.

I am deaf
I respond better to
visual commands

Label 3.

Please do not feed me
Doctors orders
I am taking medication

Label 4.

Please be careful with me
I just had major surgery

Label 5.

Please be careful with me
I am expecting soon

Label 6.

Please do not pet me
Sometimes I may bite

Label 7.

I am blind
I need your help
to guide me

Label 8.

I need my medication __X__
Please record it here

| J | F | M | A | M | J | J | A | S | O | N | D |
|---|---|---|---|---|---|---|---|---|---|---|---|
| 1 | 2 | 3 | 4 | 5 | 6 | 7 | 8 | 9 | 10 | | |
| 11 | 12 | 13 | 14 | 15 | 16 | 17 | 18 | 19 | 20 | | |
| 21 | 22 | 23 | 24 | 25 | 26 | 27 | 28 | 29 | 30 | 31 | |

---

While this invention has been described in great detail, it is to be understood that various modifications, alternatives and improvements can be made without departing from the spirit and scope of the present invention as defined in the following claims.

I claim:

1. A message holding device comprising a label holder made of a flexible material wherein the label holder has two slits, each slit being at opposite ends of the label holder, wherein the slits are oriented perpendicularly to the long axis of the label holder and extend through the thickness of the label holder, wherein each of the slits terminate in a circle cut-out, which slits are adapted to accomodate a strap with a snap buckle type connector and to close so as to press on the strap to prevent the the device from slipping around the strap.

2. The device of claim 1 wherein the label holder comprises a material which can be written upon.

3. The device of claim 2 wherein the material is a waterproof material which will not smear.

4. The device of claim 1 wherein said label holder has a peelably attached message on the surface of the label holder between the slits.

5. A combination collar with a message holder device comprising a collar having a strap and a connector, and a message holding device comprising a label holder made of a flexible material wherein the label holder has two slits, each slit being at opposite ends of the label holder, wherein the slits are oriented perpendicularly to the long axis of the label holder and extend through the thickness of the label holder, wherein each of the slits terminates in a circle cut-out, wherein the strap extends through each slit, each said slit is adapted to open wide to accomodate the said connector and close to prevent the message holding device from slipping around the strap.

6. The device of claim 5 wherein the label holder comprises a material which can be written upon.

7. The device of claim 6 wherein the material is a waterproof material which will not smear.

8. The device of claim 5 wherein said label holder has a peelably attached message on the surface of the label holder between the slits.

* * * * *